Patented Oct. 23, 1934

1,978,201

UNITED STATES PATENT OFFICE

1,978,201

CUT FLOWER NUTRIENT

William Heuer, Irvington, N. J.

No Drawing. Application December 23, 1932,
Serial No. 648,627. Renewed March 23, 1934

8 Claims.  (Cl. 47—1)

The invention relates to a cut flower nutrient and more particularly to a novel method and product for prolonging and increasing the life and bloom of cut flowers. The invention may also be utilized as a stimulant or fertilizer for potted plants.

It is a well known fact that one of the most troublesome problems encountered by flower shops and flower growers is the maintenance of flowers in their natural state after they have been cut from the plants. This failure results not only in a great amount of wastage but in a number of dissatisfied customers which sometimes may be ruinous to a florist's business.

It is also practically impossible to keep flowers used in funeral pieces or set pieces in their natural state of beauty for any length of time, because, without water the flowers must soon wither and wilt.

Another problem of the flower grower resides in the shipping of flowers, particularly where they have to be transported a long distance. They are often received by the flower shop in a condition so wilted that it is impossible to revive them.

In accordance with the present invention a solution or compound, hereinafter described, is provided for treating the cut flowers or potted plants. This solution or compound is diluted with water and the cut flowers are placed therein or the diluted solution may be poured over the earth in which a potted plant is growing. The cut flowers may remain in the diluted solution and their life will be greatly prolonged and the bloom increased. In shipping flowers, after they have been cut and prior to being packed, they are placed in the diluted solution for a given time, depending upon the type of flower, and a sufficient amount of the solution will be taken up by the flower stems and leaf tissues to preserve the life and bloom of the flower while being shipped and greatly prolong their life thereafter.

The compound used for introduction into the water with which the cut flowers are to be treated preferably comprises sugar, kaolin and yeast. To this may be added small amounts of charcoal, oil of pine and lime.

The sugar or, if desired, saccharin, acts as a cut flower nutrient. The kaolin, or other forms of clay, absorbs gases and contains some of the natural elements beneficial to plant life. The yeast, which is preferably dehydrated yeast, is the most essential ingredient for the success of the composition. The charcoal, which is preferably animal charcoal, tends to overcome putrefaction of the yeast and it is believed to intensify the color of the bloom. The oil of pine aids in giving a pleasant odor to the diluted solution and the lime tends to keep the water sweet and prevent a lumpy condition.

The mixture has been successfully used made up in the following manner: 8 ounces of sugar or saccharin, 2 ounces of kaolin, 1 ounce of yeast, ½ ounce of charcoal, 1 c. c. of oil of pine and ½ ounce of lime. The foregoing makes up a composition weighing about 12 ounces and this may be dissolved in a suitable amount of water. It has been found in practice that this diluted solution shows benefit to all cut flowers.

The benefit is so decisive that increased turgidity and intensified color in the tissue of leaf and petal are visible to the eye usually within thirty minutes after the flower stem is immersed in the diluted solution. This increased turgidity and intensified color is retained by the flower whether under average room temperature of 70° F. or in refrigerated temperatures of 40°–50° F., although a cooler temperature, as when untreated, prolongs the life of the cut flower.

The treated cut flower under observation slowly continues its development, retaining a healthy and nourished appearance, to eventually produce seed as large and apparently vital as it would upon the parent plant which had been unusually well cared for.

Furthermore, a flower cut in the bud develops normally when treated in this solution; for instance the chrysanthemum cut when the bud first shows color will develop into a flower equal in every respect to its companions left uncut on the greenhouse bench.

Furthermore again a flower such as Lilium Giganteum or a chrysanthemum and others which have severely wilted in tissue and flower, through long storage in water or without water, to a point ordinarily considered hopeless, will in most cases with an hour of treatment return to vigor and attractiveness.

Again the treated flower lasts much longer after being removed from water, in treatment such as florists must subject flowers to in funeral pieces.

Once more, some of the bad habits characteristic to certain flowers are eliminated. For instance, the so-called sleepiness of carnations, reacting from a damaging amount of carbon monoxide or very hot dry air, is prevented through this treatment.

Furthermore this treatment is equally beneficial to the cut flower at any period in its normal cut life and need not be used immediately on cutting before placing the flower in water. The only important variant in the treatment's benefit to different flowers is in the duration of this immersion. Certain flowers show as much benefit after an immersion of only one or two hours, as from a longer treatment.

The material furthermore, having about the same specific gravity as water diffuses rapidly when added to water and requires no stirring to maintain its uniform solution and suspension.

Pending further investigation of a detailed scientific nature, the explanation of the above results in terms of this solution's influence upon the internal functions of the conducting and storage and epidermal tissues of the cut flower is believed to be as follows:

The first and quickest action is in all probability a direct result of osmotic pressure set up by the solution in the water. This pressure speeds up the passage of liquids through the phloem and xylem of the flower stem and leaves. Contrary to the aims of most attempts in past research in cut flower preservation, water loss or transpiration from the leaves of the cut flower is increased by this material, in fact, more than doubled. The result is evidently beneficial. The materials in the solution are in part of such a nature as to pass easily and normally without damage through the cell walls, to be distributed rapidly to all tissues in a concentration optimum for organic life.

Thus the beneficial ingredients are soon to be found throughout the tissues and the secondary phase of the action begins.

First, some of these ingredients are such as the cell produces in metabolism and later uses for the production of heat and energy which supports its life.

Secondly, there are certain other organic and inorganic materials which seem to stimulate the manufacture and activity of reducase and other hormones and enzymes which are active in promoting the life and growth of plant tissue.

Thus the treatment benefits as follows:

The metabolic end-products supplied in plentiful amounts remove the necessity of the plant's breaking down and using up its food reserve.

The hormones being increased insure more efficient delivery of necessary organic compounds to the plant cells which are operating under trying circumstances.

Finally there are certain less understood constituents unique to this material, to which its so far unparalleled results may be partially attributed.

It will be understood that the table of ingredients heretofore given is in no way limitative, and that while still keeping within the spirit of the invention, modifications of the portions of the ingredients may be made in the compound according to conditions and in the treatment of different varieties of flowers.

I claim:

1. A compound to be used in the treatment of cut flowers, said compound comprising a mixture of sugar and yeast.

2. A compound to be used in the treatment of cut flowers, said compound comprising a mixture of sugar, yeast and kaolin.

3. A compound to be used in the treatment of cut flowers, said compound comprising a mixture of sugar, yeast, kaolin and charcoal.

4. A compound to be used in the treatment of cut flowers, said compound comprising a mixture of sugar, yeast, kaolin, oil of pine and lime.

5. A method of prolonging the life and bloom of cut flowers which consists in treating the flowers with a compound of sugar, yeast and kaolin diluted in water.

6. A compound to be used in the treatment of cut flowers, said compound comprising the following ingredients mixed in substantially the following proportions: 8 ounces of sugar, 2 ounces of kaolin, 1 ounce of yeast, ½ ounce of charcoal, a c. c. of oil of pine and ½ ounce of lime.

7. A compound to be used in the treatment of cut flowers, said compound comprising a mixture of sugar, yeast and kaolin and an agent to overcome putrefaction.

8. A compound to be used in the treatment of cut flowers, said compound comprising a mixture of sugar, yeast, kaolin, an agent to overcome putrefaction and a deodorizing agent.

WILLIAM HEUER.